United States Patent
Bharitkar et al.

(10) Patent No.: US 11,317,232 B2
(45) Date of Patent: Apr. 26, 2022

(54) ELIMINATING SPATIAL COLLISIONS DUE TO ESTIMATED DIRECTIONS OF ARRIVAL OF SPEECH

(71) Applicant: HEWLETT-PACKARD DEVELOPMENT COMPANY, L.P., Spring, TX (US)

(72) Inventors: Sunil Bharitkar, Palo Alto, CA (US); Madhu Sudan Athreya, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 48 days.

(21) Appl. No.: 16/605,195

(22) PCT Filed: Oct. 17, 2017

(86) PCT No.: PCT/US2017/056861
§ 371 (c)(1),
(2) Date: Oct. 14, 2019

(87) PCT Pub. No.: WO2019/078816
PCT Pub. Date: Apr. 25, 2019

(65) Prior Publication Data
US 2021/0289306 A1    Sep. 16, 2021

(51) Int. Cl.
*H04S 7/00* (2006.01)
*H04R 3/00* (2006.01)

(52) U.S. Cl.
CPC ............ *H04S 7/302* (2013.01); *H04R 3/005* (2013.01); *H04R 2430/21* (2013.01); *H04S 2400/11* (2013.01); *H04S 2420/01* (2013.01)

(58) Field of Classification Search
CPC ..... H04R 2430/21; H04R 3/005; H04S 7/302; H04S 2420/01; H04S 2400/11
(Continued)

(56) References Cited

U.S. PATENT DOCUMENTS

| | | | |
|---|---|---|---|
| 5,335,011 A * | 8/1994 | Addeo | H04N 7/15 348/14.1 |
| 6,449,593 B1 | 9/2002 | Valve | |

(Continued)

FOREIGN PATENT DOCUMENTS

| | | |
|---|---|---|
| CN | 102831898 | 12/2012 |
| CN | 102845127 | 12/2012 |

(Continued)

OTHER PUBLICATIONS

Alexandridis, A. et al.,"Capturing and Reproducing Spatial Audio Based on a Circular Microphone Array", 2013, Journal of Electrical and Computer Engineering, p. 1-17.

(Continued)

*Primary Examiner* — Paul Kim
(74) *Attorney, Agent, or Firm* — Fabian VanCott (57) ABSTRACT

A communication system may include, in an example, a first computing device communicatively coupled, via a network, to at least a second computing device maintained at a geographically distinct location than the first computing device; the first computing device including: an array of audio output devices and a processor to receive transmitted speech data and metadata describing an estimated direction of arrival (DOA) of speech from a plurality of speakers at an array of microphones at the second computing device and render audio at the array of audio output devices associated with the first computing device by eliminating spatial collision during rendering; said spatial collision arising due to the low angular separation of the estimated DOA of a plurality of speakers.

20 Claims, 4 Drawing Sheets

(58) Field of Classification Search
USPC .......................................................... 381/303
See application file for complete search history.

(56) References Cited

U.S. PATENT DOCUMENTS

| | | |
|---|---|---|
| 9,530,426 B1 | 12/2016 | Wright et al. |
| 9,549,253 B2 | 1/2017 | Alexandridis et al. |
| 9,668,080 B2 | 5/2017 | Sun et al. |
| 2006/0239443 A1 | 10/2006 | Oxford et al. |
| 2015/0049892 A1* | 2/2015 | Petersen .............. H04R 25/554 |
| | | 381/315 |
| 2015/0244868 A1 | 8/2015 | Cartwright et al. |
| 2015/0286459 A1 | 10/2015 | Habets et al. |

FOREIGN PATENT DOCUMENTS

| | | |
|---|---|---|
| CN | 104604257 | 5/2015 |
| CN | 106817652 | 6/2017 |
| CN | 107005677 | 8/2017 |
| CN | 107113496 | 8/2017 |
| EP | 2840807 A1 | 2/2015 |
| KR | 101678305 | 11/2016 |
| WO | WO2012072804 A1 | 6/2012 |
| WO | WO2017064368 A1 | 4/2017 |

OTHER PUBLICATIONS

Pulkki, V. et al., Directional Audio Coding—Perception-based Reproduction of Spatial Sound, Nov. 11-13, 2009, In Proceedings of the Int'l Workshop on the Principle and Application of Spatial Hearing, pp. 11-13.

* cited by examiner

ELIMINATING SPATIAL COLLISIONS DUE TO ESTIMATED DIRECTIONS OF ARRIVAL OF SPEECH

BACKGROUND

Communication has been benefitted by the development of communication over a network such as an intranet, and internet, an extranet, or the Internet. Videoconferencing and teleconferencing allow users physically located in a plurality of distinct geographical locations to converse with each other and share information.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Communicating to multiple parties that are located at geographically distinct locations is a cost-effective way to conduct business as well as share information. Such processes have connected individuals and companies from across the world providing for better growth and idea sharing to all who have been involved.

The systems that allow for such communication generally involve at least the real-time relating of voice to another location. The voice of a speaker may be picked up by an audio input device such as a microphone and, in the case of internet teleconferencing for example, sends data representative of the voice to another location to be played back to a listener in real-time or at least near real-time. In the case of videoconferencing, not only is the audio sent to a distinct geographic location, but video is as well allowing for a relatively better experience for a user of the videoconferencing system.

The communication experience may be hampered, however, due to lack of spatiality of audio sent to the distinct geographic locations. In some examples, having spatial audio in communications may significantly improve collaboration quality, satisfaction, speech intelligibility, and quality of experience (QoE) for the user. The present specification describes a system that can achieve a relatively higher QoE for, at least, voice communication than other communication systems.

The present specification describes a communication system that includes a first computing device communicatively coupled, via a network, to at least a second computing device maintained at a geographically distinct location than the first computing device; the first computing device including an array of audio output devices, and a processor to receive transmitted speech data and metadata describing an estimated direction of arrival (DOA) of speech from a plurality of speakers at an array of microphones at the second computing device, and render audio at an array of audio devices associated with the first computing device by eliminating spatial collision during rendering; said collision arising due to the low angular separation of the estimated DOA of a plurality of speakers.

The present specification also describes a method, that includes receiving audio input at an array of microphones at a first computing device from a number of speakers, estimate a direction of arrival (DOA) of the audio input from each of the number of speakers, and transmit speech data and sets of metadata describing the estimated DOA for each of the number of speakers to a second computing device, render audio playback at the second computing device eliminating spatial collision due to the estimated DOAs of the plurality of speakers.

The present specification further describes a videoconferencing system, that includes a plurality of geographically distinct videoconferencing computing devices, each videoconferencing computing device including a microphone array, a number of loudspeakers (e.g., embedded in a single or plurality of soundbars); and a number of video output devices, and a processor to estimate a direction of arrival of speech associated with a first plurality of speakers to the microphone array, transmit speech data and sets of metadata describing the estimated direction of arrival (DOA) of the first plurality of speakers, and receive transmitted speech data and metadata and render audio at the number of soundbars to eliminate spatial collision due to estimated DOAs of a second plurality of speakers.

As used in the present specification and in the appended claims, the term "speaker" is meant to be understood as a person speaking that provides, to an audio input device, audio via a voice. In some examples, "speaker" is to be understood as a single person or a plurality of people as so indicated.

Figure 1:
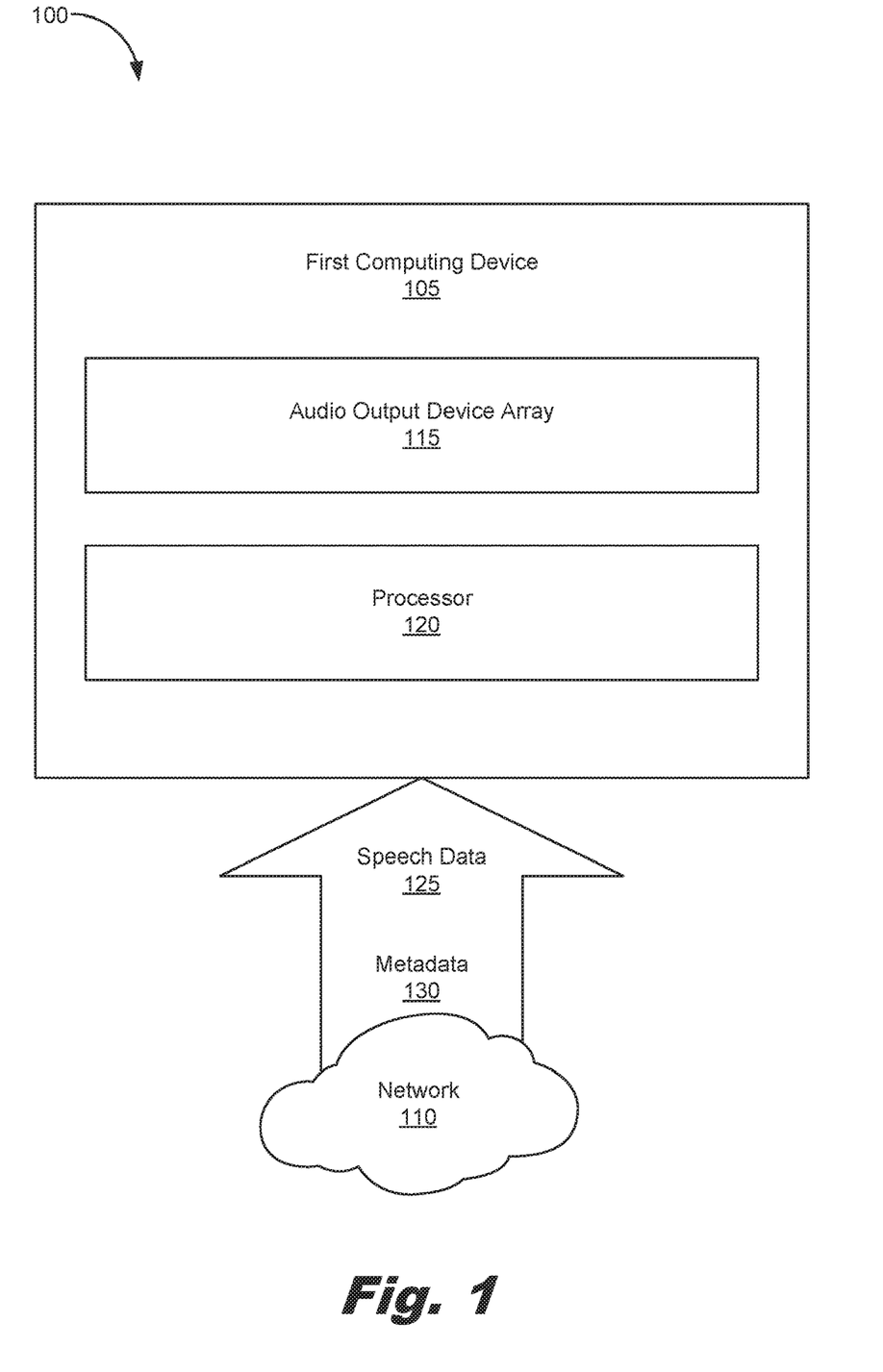
FIG. 1 is a block diagram of a communication system according to an example of the principles described herein.

Turning now to the figures, FIG. 1 is a block diagram of a communication system (100) according to an example of the principles described herein. The communication system (100) may include a first computing device (105) communicatively coupled, via a network (110), to at least a second computing device maintained at a geographically distinct location than the first computing device (105). In an example, a first computing device (105) may be communicatively coupled over a network (110) to a plurality of computing devices with each of the first and plurality of computing device being at distinct geographic locations. Consequently, the present specification contemplates that audio and/or video data sent over the network (110) by the first computing device (105) may be sent to a plurality of computing devices (i.e., the second computing device) all of which receive the data and implement the functions as described herein. The first computing device (105) may include an array of audio output devices (115) and a processor (120) to execute computer readable program code to implement the functionality of the communication system (100) as described herein.

The first computing device (105) and, at least, second computing device may each be implemented in an electronic device. Examples of electronic devices include servers, desktop computers, laptop computers, personal digital assistants (PDAs), mobile devices, smartphones, gaming systems, and tablets, among other electronic devices.

The communication system (100) and first computing device (105) may be utilized in any data processing scenario including, stand-alone hardware, mobile applications, through a computing network, or combinations thereof. Further, the communication system (100) and first computing device (105) may be used in a computing network, a public cloud network, a private cloud network, a hybrid cloud network, other forms of networks, or combinations thereof. In one example, the methods provided by the communication system (100) and/or first computing device (105) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which modules and/or computer readable program code in the system can be executed on one or across multiple platforms. Such modules can run on various forms of cloud technologies and hybrid cloud technologies or offered as a SaaS (Software as a service) that can be implemented on or off the cloud. In another example, the methods provided by the communication system (100) and/or first computing device (105) are executed by a local administrator.

To achieve its desired functionality, the first computing device (105) may include various hardware components. Among these hardware components may be a number of processors (120); a number of data storage devices; a number of peripheral device adapters, and a number of network adapters. These hardware components may be interconnected through the use of a number of busses and/or network connections. In one example, the processor (120), data storage device, peripheral device adapters; and network adapter may be communicatively coupled via a bus.

The processor (120) may include the hardware architecture to retrieve executable code from the data storage device and execute the executable code. The executable code may, when executed by the processor (120), cause the processor (120) to implement at least the functionality of receiving transmitted speech data (125) and metadata (130) describing an estimated direction of arrival (DOA) of speech from a plurality of speakers at an array of microphones at the second computing device and render audio at the array of audio output devices (115) associated with the first computing device (105) by eliminating spatial collision during rendering with the collision arising due to the low angular separation of the estimated DOA of a plurality of speakers, according to the methods of the present specification described herein. In the course of executing code, the processor (120) may receive input from and provide output to a number of the remaining hardware units.

The data storage device may store data such as executable program code that is executed by the processor (120) or other processing device. As will be discussed, the data storage device may specifically store computer code representing a number of applications that the processor (120) executes to implement at least the functionality of the communication system (100) and/or first computing device (105) as described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor (120) may boot from Read Only Memory (ROM), maintain nonvolatile storage in the Hard Disk Drive (HDD) memory, and execute program code stored in Random Access Memory (RAM).

Generally, the data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the first computing device (105) enable the processor (120) to interface with various other hardware elements, external and internal to the first computing device (105). For example, the peripheral device adapters may provide an interface to input/output devices, such as, for example, the audio output device array (115), a display device, a mouse, or a keyboard. The peripheral device adapters may also provide access to other external devices such as an external storage device, a number of network devices such as, for example, servers, switches, and routers, client devices, other types of computing devices, and combinations thereof.

A display device may be included with the first computing device (105) to allow a user of the first computing device (105) to interact with and implement the functionality of the first computing device (105). The peripheral device adapters may also create an interface between the processor (120) and the display device, a printer, or other media output devices. The network adapter may provide an interface to other computing devices within, for example, the network, thereby enabling the transmission of data between the first computing device (105) and other devices located within the network.

The first computing device (105) may, upon execution of the processor (120), display the number of graphical user interfaces (GUIs) on the display device associated with the executable program code representing the number of applications stored on the data storage device. Examples of display devices include a computer screen, a laptop screen, a mobile device screen, a personal digital assistant (FDA) screen, and a tablet screen, among other display devices.

As mentioned above, during operation of the communication system (100), the processor (120) receives metadata (130) describing an estimated direction of arrival (DOA) of speech from a plurality of speakers and transmitted speech data (125) at an array of microphones at the second computing device and renders audio at the array of audio output devices (115). The second computing device may be similar to the first computing device (105) in that it includes, at least, a network adapter to communicatively couple the second computing device to the first computing device (105) via the network (110). The second computing device may have hardware that captures transmittable speech data describing audio picked up by at least one microphone communicatively coupled to the second computing device. In an example, the second computing device may include an array of microphones. In an example, the first computing device (105) may also include a plurality of array of microphones. In these examples, the array of microphones both determines the DOA of speech and enhances, using beamforming, the speech data prior to transmitting the speech data (125) and the DOA pertinent metadata (130) as described herein. The metadata can be embedded along with the encoded speech-frame, wherein examples of speech encoders include AMR-WB, MPEG USAC, Opus, SILK, etc.

Figure 2:
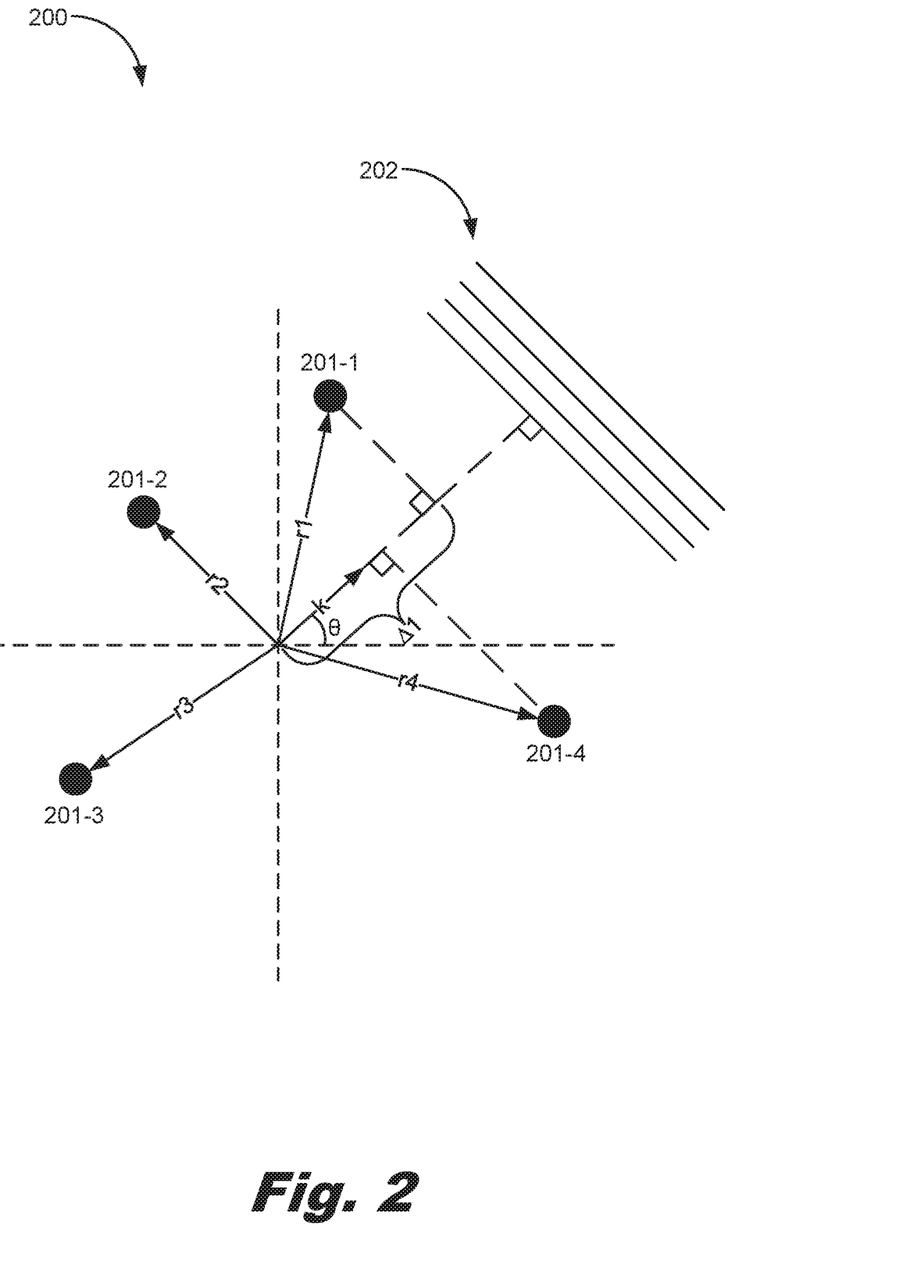
FIG. 2 is a diagram of a microphone array interfacing with at least one user according to an example of the principles described herein.

FIG. 2 is a diagram of a microphone array (200) interfacing with at least one user according to an example of the principles described herein. In the example shown in FIG. 2, the microphone array (200) includes four individual microphones (201-1, 201-2, 201-3, 201-4). The microphones (201-1, 201-2, 201-3, 201-4) of the microphone array (200) may be arranged in any layout. In the examples provided herein, the microphone array (200) may calculate the direction of arrival (DOA) of a user's speech represented by sound waves (201) in FIG. 2. As can be seen, comparisons in when a voice of a speaker reaches individual microphones results in a calculation as to where the speakers voice is originating and how far the speaker is from the microphone array (200). For example, a first microphone (201-1) may be a first distance (r1) from a central location, a fourth microphone (201-4) is a fourth distance (r4) from a central location, a second microphone (201-2) may be a second distance (r2) from a central location, and a third microphone (201-3) may be a third distance (r3) from a central location. To estimate the DOA ($\theta$), audio recorded by each of the microphones (201-1, 201-2, 201-3, 201-4) of the microphone array (200) are used. In an example, a propagation time difference (i.e., $\Delta 1$ for the first microphone 201-1) of the speaker's voice arriving at each of the microphones (201-1, 201-2, 201-3, 201-4) are measured with each of the microphones (201-1, 201-2, 201-3, 201-4) correlating data with each other.

In an example, the DOA may be determined using generalized cross correlation with phase transform (GCC-PHAT) process to determine the DOA. In this example, a time delay of arrival is computed by measuring an audio signal at one of the microphones (201-1, 201-2, 201-3, 201-4) with respect to the arrival time of the audio signal at a one of the other microphones (201-1, 201-2, 201-3, 201-4). The time delay can be estimated by finding the time lag that maximizes the cross-correlation between the two audio signals.

Having determined the differences between the arrival of the speaker's voice at each of the microphones (201-1, 201-2, 201-3, 201-4), a DOA can be calculated and provided to the first computing device (105) in the form of metadata describing the DOA as well as data describing the audio signal as well. In some examples, the geometry of the room in which the microphone array (200) is kept may be used to determine the spatial location of a speaker and hence the DOA of the speaker's voice.

This process occurs for every speaker's voice that is directed to the microphone array (200) and can accommodate a plurality of speakers using the first computing device (105) and microphone array (200). The same process may also be conducted at the second computing device with its accompanying microphone array (200) of microphones (201-1, 201-2, 201-3, 201-4).

In an example, microphone (201-1, 201-2, 201-3, 201-4) beamforming is used to determine directional signal reception. In this example, signals received by each of the microphones (201-1, 201-2, 201-3, 201-4) are combined in such a way so that signals at particular angles experience constructive interference while others experience destructive interference. The may enhance the quality of the audio transmitted to the second computing device and/or received by the first computing device (105).

In an example, the captured audio signal at each of the microphones (201-1, 201-2, 201-3, 201-4) of the microphone array (200) may be processed using a head-related transfer function. In this example, the audio input at the microphones (201-1, 201-2, 201-3, 201-4) is transformed at the processor (120) such that the audio is synthesized as a binaural sound that is perceived to come from a particular point in space such as the DOA described herein. This transformation may be used in an example where the first computing device that is receiving the transmitted speech data and metadata describing an estimated direction of arrival (DOA) of speech from rendering headphones.

In the examples where head-related transfer function is used to process the audio signal received at the microphone array (200), additional crosstalk cancellation processing may be employed in first computing device (105). In these examples, the crosstalk may be canceled by, for example, reproducing recorded data at the microphone array (200) that generates a crosstalk signal by reproducing an adjacent track while simultaneously reading a target track and at least one adjacent track by one beam, and cancels the crosstalk by deducting the crosstalk signal from the reproduction signal. It should be understood that this is merely an example, and the present specification contemplates other methods and processes to cancel crosstalk in the audio signal. The process used to cancel crosstalk may include, in an example, with a processor, identifying a location on a target, determining a direction, an amplitude, and a frequency of ambient sounds within a zone of operation, calculating a counter soundwave based on the direction, the amplitude, and the frequency to suppress the ambient sounds, and transmitting the counter soundwave to at least one audio output device to be emitted toward the location on the target. In addition to crosstalk cancelation, loudness enhancement processes may be employed in order to increase loudness of the audio by monitoring ambient noise and using a multi-band dynamic range controller (MBDRC).

In an example, the captured audio signal at each of the microphones (201-1, 201-2, 201-3, 201-4) of the microphone array (200) may be processed using an audio panning process. The audio panning system may alter the audio signal received by the microphones (201-1, 201-2, 201-3, 201-4) to simulate a perceived direction of the audio. In either case where the audio panning process or head-related transfer function is used, the processing may be done at the first computing device (105), a second computing device, and/or at a central computing device such as a communication server communicatively coupled to the first computing device (105) and second computing device.

Once the DOA of at least one speakers voice is determined, metadata (130) describing the estimated DOA of speech from a plurality of speakers at an array of microphones at the second computing device is sent to, for example, any other computing device such as the first computing device (105), communicatively coupled to the communication system (100). The first computing device (105) then renders audio at the array of audio output devices (115) associated with the first computing device (105) by eliminating spatial collision during rendering. The spatial collision arises due to a low angular separation of the estimated DOA of a plurality of speakers at the second computing device. For example, if speaker A in geographical location 1 has a DOA of 45 degrees (DOA(A,1)=45 degrees), and speaker B in geographical location 2 has a DOA of within +/−n degrees of 45 degrees (viz., DOA(B, 2)=45+/−n degrees) then the rendering process by the processor (120) would reposition the speech of speaker B to be rendered at a spatial location θ of 45+n<θ or θ<45−n degrees. The repositioning and rendering (using HRTFs or audio panning) is done while ensuring there are no other collisions between repositioned audio and directions associated with other speakers. The rules for determining the new positions for rendering can be done based on the spatial resolution of human hearing. For frontal direction, the spatial resolution ε(θ) for discriminating sound sources may be finer than on the sides or behind. So if |DOA(B,2)−DOA (A,1)|<ε(θ)D0A(A,1)), then re-positioning to a new position would be done by the processor (120).

Figure 3:
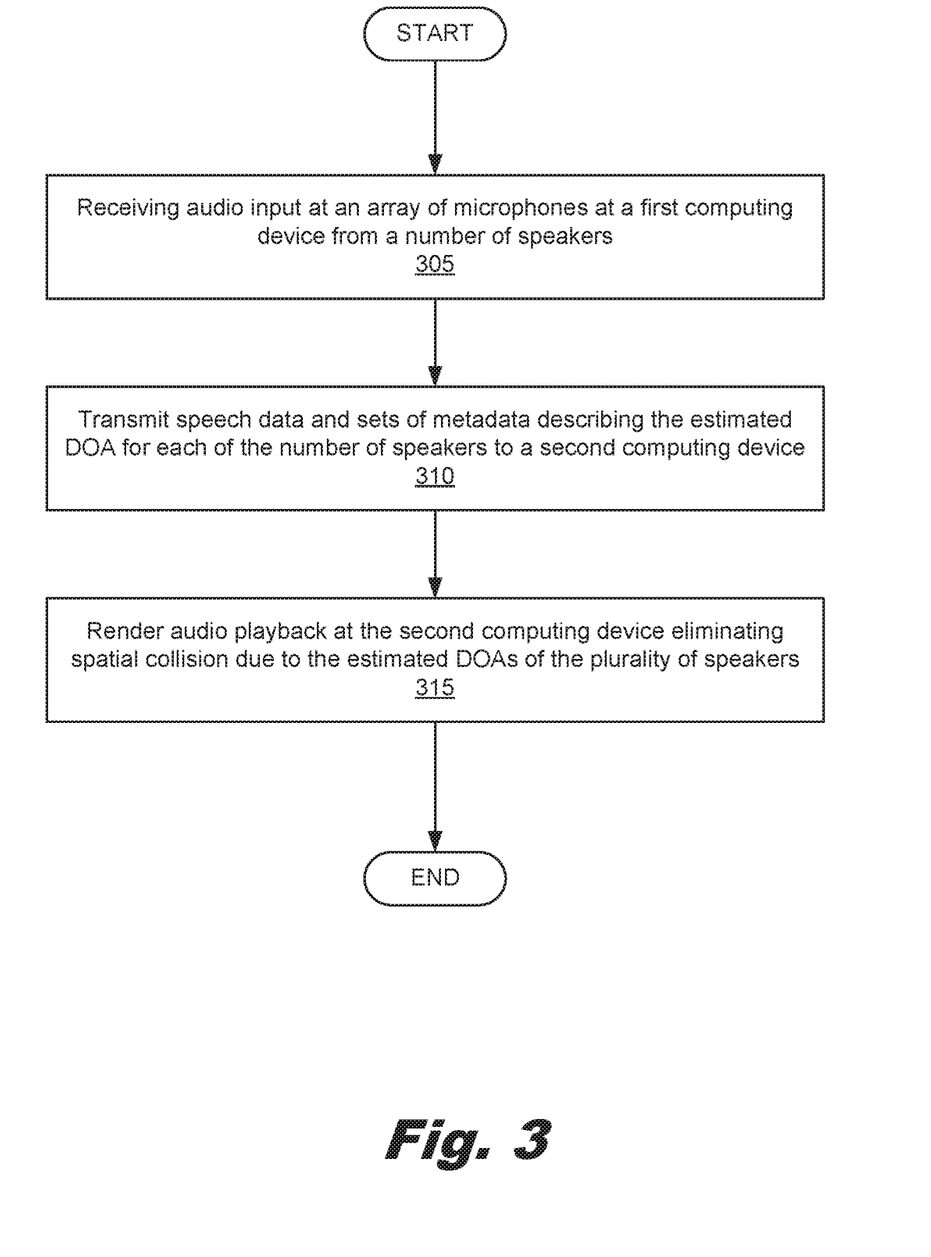
FIG. 3 is a flowchart showing a method of communicating via a network according to an example of the principles described herein.

FIG. 3 is a flowchart showing a method (300) of communicating via a network according to an example of the principles described herein. The method (300) may being with receiving (305) audio input at an array of microphones (FIG. 2, 200) at a first computing device (FIG. 1, 105) from a number of speakers. As described above, the array of microphones (FIG. 2, 200) may include any number of microphones (FIG. 2, 201-1, 201-2, 201-3, 201-4) with the audio signal received by the microphones (FIG. 2, 201-1, 201-2, 201-3, 201-4) being used to determine an estimated DOA of any of the number of speakers using the communication system (FIG. 1, 100).

Metadata describing the estimated DOA may be generated for each individual speakers' speech and the communication system (FIG. 1, 100) may transmit (310) the speech data and sets of metadata describing the estimated DOA for each of the number of speakers to a second computing device. Again, each of the sets of metadata describing the estimated DOA of each of the number of speakers may be processed using a head-related transfer function, crosstalk cancellation, audio panning, and/or loudness enhancement prior to being rendered at the second computing device.

The second computing device may include at least one audio output device. Examples of audio output devices may include laptop speakers, headphones, a soundbar, and/or a plurality of soundbars. The method may, therefor, continue by rendering (315) audio playback at the second computing device while eliminating spatial collision due to the estimated DOAs of the plurality of speakers. In an example, eliminating spatial collision during rendering (315) may be a function of a predetermined audio output device arrangement at the second computing device, a number of speakers, a number of geographically distinct computing devices, or combinations thereof. These factors may be taken into account when rendering (315) the audio playback at the second computing device so as the increase the quality of experience in using the communication system (FIG. 1, 100).

In an example, rendering (315) audio playback at the second computing device by eliminating spatial collision due to the estimated DOAs of the plurality of speakers may further include coordinating a visual output of the plurality of speakers presented on a number of visual output devices at the second computing device to spatially render the speech data to be spatially congruent with the location of the plurality of speakers as they appear on the number of visual output devices. As described above, each of the computing devices communicatively coupled together to form the communication system (FIG. 1, 100) may each include a visual display device that may be used, in an example, to see as well as hear the speakers using the distinctly geographically located computing devices.

Reformatting and rendering (315) of the audio at a destination computing device may factor in the use of a single or multiple display devices. If a single display device is used along with a single soundbar located, for example, below the display device, the rendering (315) process will spatially render voice to be spatially congruent with the location of the speakers appearing on the display in the video feed. Because in some examples multiple drivers may be present in the soundbar, spatial rendering (315) may be accomplished using automated panning processes described herein.

In examples where a plurality of displays are used in connection with at least one of the computing devices and a plurality of soundbars are use the rendering process (315) may present video from a third computing device located in a distinctly geographic location to a second display associated with the second computing device and will spatially render the distinct speakers' voices to the soundbar having multiple drivers while ensuring audio and video for speakers exhibit spatial correlation accordingly.

Thus, the rendering (315) of the audio at any destination computing device may be dependent on a number of factors including the number of other distinctly geographically located computing devices located in individual conference rooms as well as the type and number of audio input devices (i.e., microphones; FIG. 2, 201-1, 201-2, 201-3, 201-4) and audio output devices (i.e., soundbars) associated with the distinctly geographically located computing devices. By way of example, the destination of the audio signal may be in one or several conference rooms geographically dispersed with each conference room having a number of soundbars (1-P) with each soundbar including a number of drivers (Kp). Reformatting and rendering (315) in the conference rooms may include an automated panning (amplitude-pan or vector based amplitude panning technique) between drivers/soundbars and panning inside zones of any given destination conference room depending on the audio coming from a source conference room (1-M). For example, a policy enacted by the communication system (FIG. 1, 100) may dictate that three spatial reproduction zones be set within any given destination room where three source conference rooms are present and therefore a total of 4 computing devices are communicatively coupled via the network (FIG.

1, 110) in the communication system (FIG. 1, 100). In this example, spatial rendering (i.e., panning) may occur in corresponding zones from which DOA parameters are associated with that of the source room with its computing device. This may be done in order to prevent spatial collisions as described herein.

Where the communicating computing devices are personal computing (PC) devices having PC-type audio output devices, reformatting of the audio and rendering (315) of that audio may be accomplished using crosstalk cancelation and HRTF rendering on those PC speakers. In this example, similar principles of spatial collision and zoning may apply such that conference rooms acting as a potential source of the audio would be rendered (315) to appear in, for example, a left quadrant, a front-right quadrant, a rear-right quadrant, among others depending on the number of distinctly geographically located computing devices associated with the communication system (FIG. 1, 100).

Where the communicating computing devices have headphones coupled to them and being used by a speaker, reformatting of the audio and rendering (315) of that audio may be done without engaging a crosstalk cancellation process but instead with a HRTF process. Consequently, the presently described communication system (FIG. 1, 100) and method takes into consideration the hardware (i.e., audio output devices) at an audio receiving computing device and adjust the rendering of the audio based on that hardware and their characteristics. In an example, the hardware and corresponding characteristics associated with each of the computing device associated with the communication system (FIG. 1, 100) may be detected at each computing system and information describing that hardware and corresponding characteristics may be provided to either a central server or each of the individual computing devices. With this information, each of the participating computing devices may know how to render (315) the audio for each of the participating computing devices according to the principles described herein.

Figure 4:
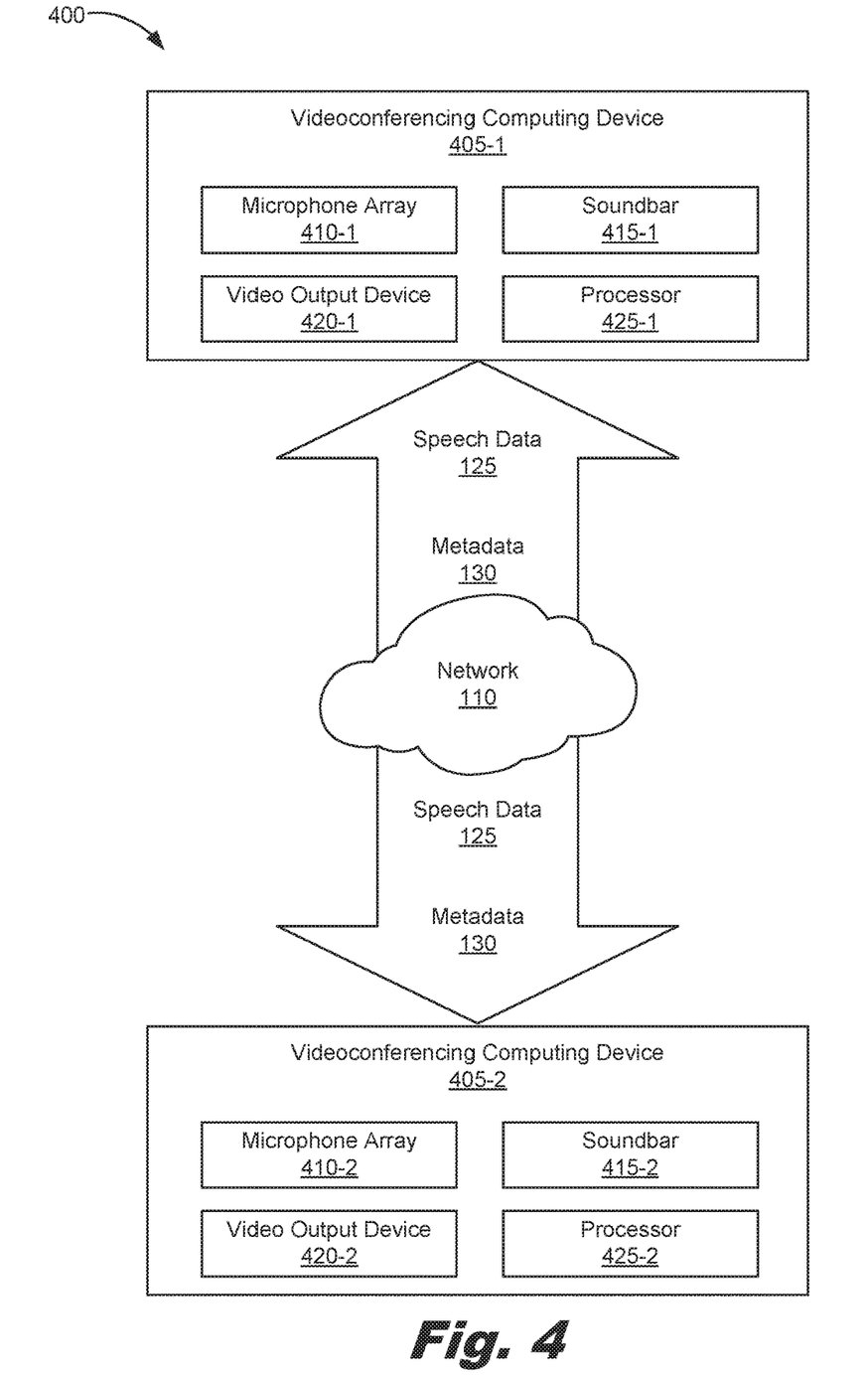
FIG. 4 is a block diagram of a videoconferencing system according to an example of the principles described herein.

FIG. 4 is a block diagram of a videoconferencing system (400) according to an example of the principles described herein. The videoconferencing system (400) may include a plurality of geographically distinct videoconferencing computing devices (405-1, 405-2). Each of the plurality of geographically distinct videoconferencing computing devices (405-1, 405-2) may include a microphone array (410-1, 410-2), a number of soundbars (415-1, 415-2), a number of video output devices (420-1, 420-2), and a processor (425-1, 425-2).

During operation, each of the processors (425-1, 425-2) may estimate a direction of arrival (DOA) of speech associated with a first plurality of speakers to the microphone array (410-1, 410-2), transmit speech data and sets of metadata describing the estimated DOA of the first plurality of speakers, and receive transmitted speech data and metadata and render audio at the number of soundbars (415-1, 415-2) to eliminate spatial collision due to estimated DOAs of a second plurality of speakers. As described herein, eliminating spatial collision due to the estimated DOAs of the second plurality of speakers is a function of a predetermined playback room, the number of speakers within the second plurality of speakers, and/or the number of geographically distinct rooms. Additionally, each of the number of soundbars (415-1, 415-2) may each comprise a number of drivers such that any received transmitted speech data is automatically panned between drivers in the soundbars based on the number of sets of received transmitted speech from the plurality of geographically distinct videoconferencing computing devices (405-1, 405-2).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor of the computing devices or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe systems and methods that eliminate spatial collisions due to estimated directions of arrival of speech during, for example, a videoconferencing session. The videoconferencing system and communication system described herein provide for a relatively higher quality of experience by rendering, at a second computing device, audio detected at a first computing device based on the hardware and characteristics of an audio output device of the second computing device among other factors. Considerations are taken as to the layout of the room the second computing device is located in, the type of audio output device, and the number of videoconferencing computing devices participating within the communication system. Additionally, spatial collision is eliminated during rendering of the audio at the second computing device; the spatial collision arising due to the low angular separation of the estimated DOA of a plurality of speakers.

The preceding description has been presented to illustrate and describe examples of the principles described. This description is not intended to be exhaustive or to limit these principles to any precise form disclosed. Many modifications and variations are possible in light of the above teaching.

What is claimed is:
1. A communication system, comprising:
a first computing device communicatively coupled, via a network, to at least a second computing device maintained at a geographically distinct location than the first computing device; the first computing device comprising:
an array of audio output devices; and
a processor to:
receive transmitted speech data and metadata describing an estimated direction of arrival (DOA) of speech from a plurality of speakers at an array of microphones at the second computing device; and
render audio at the array of audio output devices associated with the first computing device by eliminating spatial collision during rendering; said spatial collision arising due to the low angular separation of the estimated DOA of a plurality of speakers.

2. The communication system of claim 1, wherein the at least second computing device comprises:
an array of microphones; and
a processor to:
estimate a direction of arrival of speech to the array of microphones associated with a number of speakers; and
transmit speech data and sets of metadata describing the estimated direction of arrival (DOA) of the number of speakers.

3. The communication system of claim 1, wherein the at least second computing device comprises a plurality of computer devices each at the geographically different locations each plurality of computer devices comprising one of a single microphone with a single speaker or multiple speakers using an array of microphones.

4. The communication system of claim 1, wherein the metadata describing an estimated direction of arrival (DOA) of speech from a plurality of speakers at an array of microphones at the second computing device is processed by the first computing device using one of an audio panning system or a head-related transfer function system before rendering the audio based on whether the computing device comprises loudspeakers or headphones.

5. The communication system of claim 1, wherein eliminating spatial collision during rendering is a function of a predetermined loudspeaker arrangement at the first computing device, the number of speakers, the number of geographically distinct computing devices, or combinations thereof.

6. The communication system of claim 1, wherein eliminating spatial collision due to the estimated DOAs of the plurality of speakers is accomplished by steering a sound field associated with respective speakers to different spatial sound regions reproduced by the array of audio output devices.

7. The communication system of claim 1, wherein the array of audio output devices is a number of soundbars each with a number of drivers and wherein the received transmitted speech data is automatically panned between drivers in the soundbars based on a number of sets of received transmitted speech.

8. The communication system of claim 1, further comprising at the first computing device
a microphone array; and
a number of video output devices;
the processor to:
estimate a direction of arrival of speech associated with a first plurality of speakers to the microphone array;
transmit speech data and sets of metadata describing the estimated direction of arrival (DOA) of the first plurality of speakers to at least the second computing device.

9. The communication system of claim 8, the first computing device further comprising a number of soundbars each of which comprise a number of drivers and wherein the received transmitted speech data is automatically panned between drivers in the soundbars based on the number of sets of received transmitted speech.

10. A method, comprising:
receiving audio input at an array of microphones at a first computing device from a number of speakers;
estimating a direction of arrival (DOA) of the audio input from each of the number of speakers;
transmitting speech data and sets of metadata describing the estimated DOA for each of the number of speakers to a second computing device; and
rendering audio playback at the second computing device while eliminating spatial collision due to the estimated DOAs of the plurality of speakers.

11. The method of claim 10, further comprising processing each of the sets of metadata describing the estimated direction of arrival of each of the number of speakers is processed using a head-related transfer function prior to being rendered.

12. The method of claim 10, further wherein eliminating spatial collision due to the estimated DOAs of the plurality of speakers is a function of a predetermined playback room at the second computing device, the number of speakers, the number of geographically distinct rooms where the speech is transmitted, or combinations thereof.

13. The method of claim 10, wherein rendering the audio playback at the second computing device further comprises processing the speech data using crosstalk cancellation, a head-related transfer function (HRTF), or combinations thereof.

14. The method of claim 10, wherein rendering audio playback at the second computing device by eliminating spatial collision due to the estimated DOAs of the plurality of speakers further comprises coordinating visual output of the plurality of speakers presented on a number of visual output devices at the second computing device to spatially render the speech data to be spatially congruent with the location of the plurality of speakers as they appear on the number of visual output devices.

15. A communication system, comprising
a first computing device with a network interface to communicate, via a network, with at least a second computing device maintained at a geographically distinct location than the first computing device,
the first computing device comprising:
an array of audio output devices; and
a processor to:
receive transmitted speech data and metadata describing an estimated direction of arrival (DOA) of speech for each of a plurality of people at an array of microphones at the second computing device; and
render audio at the array of audio output devices from the speech data and metadata, including reducing spatial collision caused by at least two of the people having an angular separation as indicated by the estimated DOA that is less than a threshold.

16. The communication system of claim 15, further comprising a second array of microphones at the first computing device, the processor to output, to at least the second computing device, second speech data from the second array of microphones and second metadata describing an estimated direction of arrival (DOA) of speech for each of a second plurality of people at the second array of microphones.

17. The communication system of claim 16, wherein the second metadata indicates a geometry of a room containing the second array of microphones.

18. The communication system of claim 16, wherein the processor comprises a beamforming function to generate the second metadata.

19. The communication system of claim 15, wherein the processor comprises a head-related transfer function to reduce the spatial collision when rendering the speech data.

20. The communication system of claim 15, wherein the processor comprises an audio panning system to reduce the spatial collision by rendering a signal with a greater apparent angular separation between two speakers of the plurality of speakers when those two speakers have an estimated angular separation below the threshold.

* * * * *